US011709273B2

(12) United States Patent
Kocer et al.

(10) Patent No.: US 11,709,273 B2
(45) Date of Patent: Jul. 25, 2023

(54) STRATOSPHERIC POSITION, NAVIGATION, AND TIMING SYSTEM

(71) Applicant: Aerostar International, LLC, Columbia, MD (US)

(72) Inventors: Jared Ernest Kocer, Sioux Falls, SD (US); Scott William Wickersham, Brandon, SD (US); Bart Gallet, Arlington, VA (US)

( * ) Notice: Subject to any disclaimer, the term of this patent is extended or adjusted under 35 U.S.C. 154(b) by 767 days.

(21) Appl. No.: 16/204,968

(22) Filed: Nov. 29, 2018

(65) Prior Publication Data

US 2019/0317220 A1 Oct. 17, 2019

Related U.S. Application Data

(60) Provisional application No. 62/656,845, filed on Apr. 12, 2018.

(51) Int. Cl.
| | | |
|---|---|---|
| *G01S 19/10* | (2010.01) | |
| *G01S 19/46* | (2010.01) | |
| *G01S 19/03* | (2010.01) | |
| *G01S 19/12* | (2010.01) | |

(52) U.S. Cl.
CPC .............. *G01S 19/10* (2013.01); *G01S 19/46* (2013.01); *G01S 19/03* (2013.01); *G01S 19/12* (2013.01)

(58) Field of Classification Search
CPC .......... G01S 19/10; G01S 19/46; G01S 19/47; G01S 19/12; G01S 19/03; G01S 19/48; G01S 5/0258; G01S 5/02585
USPC ... 342/357.29, 357.3, 357.31, 357.4, 357.44, 342/357.47, 357.48, 357.49, 463
See application file for complete search history.

(56) References Cited

U.S. PATENT DOCUMENTS

| | | | |
|---|---|---|---|
| 5,949,364 A * | 9/1999 | Katzberg | ................ G01S 19/22 342/25 A |
| 6,421,010 B1 | 7/2002 | Chadwick et al. | |
| 6,478,260 B1 | 11/2002 | Rice et al. | |
| 6,628,941 B2 * | 9/2003 | Knoblach | .......... H04B 7/18576 455/431 |
| 7,356,390 B2 * | 4/2008 | Knoblach | .............. G05D 1/042 701/4 |
| 7,567,779 B2 * | 7/2009 | Seligsohn | ............ B64G 1/1007 455/12.1 |
| 9,285,450 B2 * | 3/2016 | DeVaul | ..................... G01S 5/04 |

(Continued)

FOREIGN PATENT DOCUMENTS

| | | | | |
|---|---|---|---|---|
| KR | 20130006615 A * | 1/2013 | .............. G01S 19/11 |
| WO | WO-2019/200199 A1 | 10/2019 | |

OTHER PUBLICATIONS

"International Application Serial No. PCT/US2019/027137, International Preliminary Report on Patentability dated Apr. 23, 2020", 10 pgs.

(Continued)

*Primary Examiner* — Chuong P Nguyen
(74) *Attorney, Agent, or Firm* — Kim and Lahey Law Firm

(57) ABSTRACT

Disclosed in some examples are methods, systems, devices, and machine-readable mediums for providing a PNT system provided by stratospheric balloons. This stratospheric PNT system (SPNTS) replaces the space-segment of a standard PNTS with a stratospheric segment comprising one or more stratospheric balloons that provide PNTS signals usable to determine timing, positioning, and/or navigation for user devices.

18 Claims, 8 Drawing Sheets

(56) References Cited

U.S. PATENT DOCUMENTS

| | | | |
|---|---|---|---|
| 9,584,214 B2* | 2/2017 | Teller | H04B 10/118 |
| 9,829,561 B2* | 11/2017 | Bonawitz | G01S 1/022 |
| 9,903,954 B1* | 2/2018 | Farley | G01S 19/42 |
| 9,973,268 B1* | 5/2018 | Husted | H04B 7/18534 |
| 10,324,161 B2* | 6/2019 | Bonawitz | G01S 1/022 |
| 10,581,523 B2* | 3/2020 | Barritt | H04B 10/118 |
| 10,689,083 B2* | 6/2020 | Bonawitz | B64B 1/44 |
| 10,696,400 B2* | 6/2020 | Knoblach | B64B 1/70 |
| 2002/0098849 A1* | 7/2002 | Bloebaum | G01S 19/25 455/507 |
| 2003/0052823 A1* | 3/2003 | Carroll | G01S 5/06 342/465 |
| 2006/0267841 A1* | 11/2006 | Lee | G01S 13/876 342/357.29 |
| 2011/0140962 A1* | 6/2011 | McNamara | G01S 5/0236 342/357.64 |
| 2012/0081232 A1 | 4/2012 | Lee et al. | |
| 2012/0309376 A1* | 12/2012 | Huang | G01S 5/0252 455/418 |
| 2013/0238784 A1* | 9/2013 | Teller | H04B 10/118 709/224 |
| 2014/0009332 A1* | 1/2014 | Morrison | G01S 19/11 342/357.31 |
| 2014/0085135 A1 | 3/2014 | Devaul et al. | |
| 2015/0061937 A1* | 3/2015 | Bonawitz | G01S 5/0289 342/451 |
| 2015/0070212 A1* | 3/2015 | Smith | G01S 19/215 342/357.59 |
| 2016/0154085 A1 | 6/2016 | DeVaul et al. | |
| 2017/0023659 A1* | 1/2017 | Bruemmer | G01S 19/00 |
| 2017/0122736 A1 | 5/2017 | Dold et al. | |
| 2017/0242133 A1* | 8/2017 | Yilmaz | G01S 19/26 |
| 2017/0245185 A1* | 8/2017 | Chuberre | H04L 43/0882 |
| 2017/0328683 A1* | 11/2017 | Smith | F41G 7/346 |
| 2018/0067188 A1 | 3/2018 | Bonawitz et al. | |

OTHER PUBLICATIONS

"International Application Serial No. PCT/US2019/027137, International Search Report dated Jul. 10, 2019", 2 pgs.

"International Application Serial No. PCT/US2019/027137, Written Opinion dated Jul. 10, 2019", 7 pgs.

"Australian Application Serial No. 2019252694, First Examination Report dated Aug. 23, 2021", 3 pgs.

"Australian Application Serial No. 2019252694, Response filed Dec. 14, 2021 to First Examination Report dated Aug. 23, 2021", 40 pgs.

* cited by examiner ced back to the devices. The

STRATOSPHERIC POSITION, NAVIGATION, AND TIMING SYSTEM

PRIORITY CLAIM

This patent application claims the benefit of priority, under 35 U.S.C. Section 119 to U.S. Provisional Patent Application Ser. No. 62/656,845, entitled "Stratospheric Navigation System," filed on Apr. 12, 2018 to Kocer, et al, which is hereby incorporated by reference herein in its entirety.

BACKGROUND

Position, navigation, and timing systems (PNTS) provide one or more signals to enable positioning, navigation, and timing. Positioning refers to the ability to accurately and precisely determine one's location and orientation. Navigation refers to the ability to determine a current and desired position and apply corrections to course, orientation, and speed to obtain the desired position. Timing refers to the ability to acquire and maintain accurate and precise time from a standard.

One example PNTS is a Global Navigation Satellite System (GNSS) such as the Global Positioning System (GPS). GNSS allows devices to determine their position on the earth by performing calculations on signals received by the devices from a series of satellites that orbit the earth. Ground based stations (the control segment) assist the GNSS satellites (the space segment) by ensuring proper operation of the system. For example, the control segment monitors and controls satellite orbital parameters, monitors the health and status of the satellites, activates spare satellites, updates parameters of the navigation messages (e.g., ephemeris, almanac, and clock corrections), and the like.

The control segment is made up of base stations, master control station, and data upload stations (also called ground antennas). For a PNTS such as a GNSS system, base stations distributed around the world collect GNSS signals from GNSS satellites and pass this data onto the master control station. The position of the GNSS satellites is known based upon the orbits they were inserted into. The position of the base stations is known and can be utilized to estimate satellite orbits (and correct for minor variances in the expected orbits in the navigational messages), clock errors, and to generate a navigation message. The navigation message is calculated by the master control station and sent to the satellites and then relayed down to the devices. The navigation message includes ephemeris data (used to compute the satellite locations), time parameters, clock corrections, satellite health information, ionospheric parameters model, and the almanac. Data uploading stations upload the navigation messages and other command and control information to the satellites (space segment).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
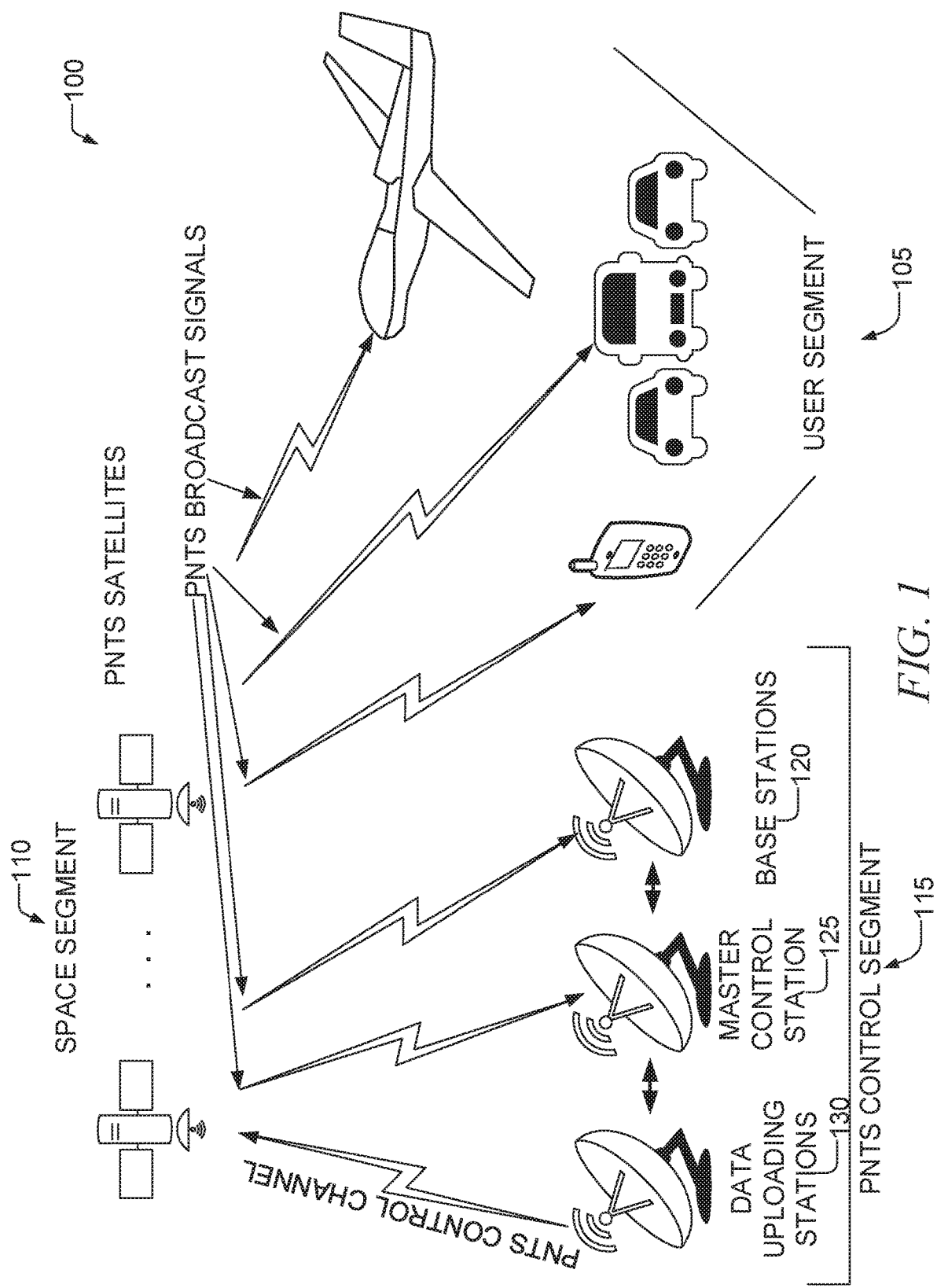
FIG. 1 shows an example of a GNSS system with a user segment comprising user devices that receive GNSS broadcast signals from the space segment comprising GNSS satellites.

FIG. 1 shows an example of a PNTS 100 with a user segment 105 comprising user devices that receive PNTS broadcast signals from the space segment 110 comprising PNTS satellites. The user devices utilize the received PNTS broadcast signals to calculate a time, calculate their respective positions, and/or navigate. Example user devices include civilian computing devices such as smartphones, car navigation systems, airplane navigation systems, and the like. Example user devices may also include military applications including precision guidance applications such as bomb guidance, missile guidance, aircraft guidance, drone guidance, unmanned aerial system (UAS) guidance, and the like. The control segment 115 comprises one or more ground stations such as base stations 120, a master control station 125, and one or more data uploading stations 130. The control segment 115 manages the satellites and calculates one or more parameters in the PNTS broadcast signals (such as navigational information). For example, in a GNSS system, the control segment utilizes signals received by the base stations to adjust the ephemeris of the satellite to account for minor deviations in the satellite's orbit. Other components may also track the satellite's position such as radar components and/or laser ranging.

While PNTS systems such as GNSS are very accurate and typically very reliable, there may be instances or circumstances in which a PNTS is unavailable. For example, one or more of the components of the PNTS may fail or be rendered inaccurate such that the system is unusable. Example circumstances may include component failure, RF or ionospheric interference, and the like. Another example circumstances arises from hostile actors such as foreign governments or terrorists. In such a scenario, both civilian and military usages of PNTS may be degraded to the point that PNTS may not be usable.

Disclosed in some examples are methods, systems, devices, and machine-readable mediums for providing a PNT system provided by stratospheric balloons. This stratospheric PNT system (SPNTS) replaces the space-segment with a stratospheric segment comprising one or more stratospheric balloons that provide PNTS signals usable to determine timing, positioning, and/or navigation for user devices. In some examples, the ground segment of the PNTS may be modified to support the stratospheric balloons (e.g., a GNSS system's ground segment may be modified). In other examples, new ground stations may be developed that provide support for the balloon segments. In some examples, the user devices may be unchanged—e.g., the balloon system may operate on the same frequencies and provide the same navigational messages that may be used as input in the same calculations to derive the position of the user device. In other examples specialized user devices may be utilized as there may be differences between the signals the balloons provide and that of typical PNTS satellites (such as typical GNSS satellites).

While in a PNTS such as a GNSS, a rough position of the satellites is known based upon the orbital parameters, in an SPNTS, the balloon position may not be as predictable due to wind currents and the like. In some examples, the balloon may have a number of sensors that may determine its position, or assist with determining its position, such as celestial object imaging sensors, cameras, and the like. In addition to, or instead of the balloon sensors, ground stations of a control segment may assist the balloon in determining its position. For example, ground stations of the control segment (e.g., base stations, master control station, data uploading station, or a new type of station) may have accurately surveyed locations and may be synchronized with each other. The balloons may carry an atomic clock that may be synchronized with the ground station to allow for accurate range computation between the ground stations that are in the line of sight. Each balloon's position may be resolved through trilateration with ground stations. This position information may be calculated by each balloon (e.g., through received transmissions from the ground station that include a precise location of the ground station and by using onboard sensors such as an altimeter), or by the ground stations (e.g., three or more ground stations may calculate the position using signals received from the balloon), or both (e.g., for enhanced accuracy, both the balloon and the ground station may both calculate the position of the balloons and compare the position in order to compute corrections). A user device may resolve its position by trilateration from pseudorange computations from multiple balloons as is done for a PNTS such as GNSS.

Figure 2:
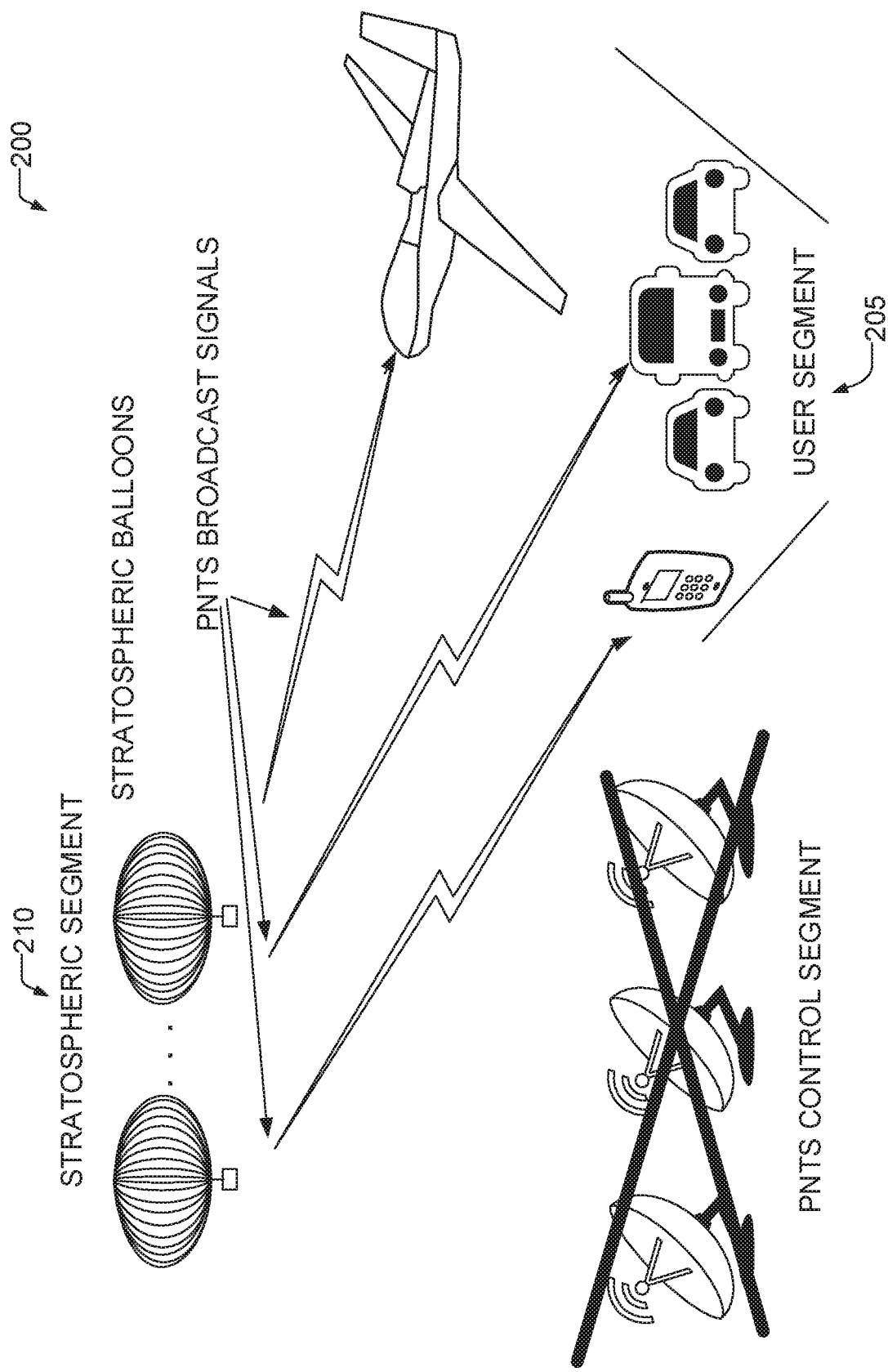
FIG. 2 illustrates an example Stratospheric, Position, Navigation, and Timing System (SPNTS) according to some examples of the present disclosure.

FIG. 2 illustrates an example SPNTS 200 according to some examples of the present disclosure. In the example of FIG. 2, a control segment is not utilized. In the example implementation of FIG. 2, the positions of each of the stratospheric balloons 210 are calculated by the balloons themselves. The stratospheric balloons 210 utilize one or more onboard sensors such as inertial navigation sensors, celestial object imaging sensors, magnetometers, barometers, altimeters, remote sensing (such as perception-based sensors such as cameras, infra-red, LIDAR, RADAR), and the like to calculate the geospatial position and altitude. The stratospheric balloons 210 may then broadcast their position data, timing signals, and the like using the same formats, timings, encodings, and modulations as used by a standard PNTS such as a GNSS to provide a signal that may be utilized in combination with other signals from other stratospheric balloons to locate a user device. The signal may be transmitted on a same frequency as a standard PNTS. The user segments 205 may be unchanged and may utilize these signals in a same manner as before. In some examples, the stratospheric balloons may not broadcast an almanac as each balloon in the SPNTS may operate independently. In other examples, the balloons may communicate with each other in a peer-to-peer fashion to create the almanac, which may be broadcast to the user devices. In some examples, the balloons may attenuate their transmissions so as not to overwhelm the receivers in the user devices that are used to much weaker satellite signals. As shown in FIG. 2, the user devices may be off-the-shelf PNTS receivers, such as GNSS receivers. In other examples, specialty receivers in the user devices may be utilized which may receive the signals on one or more different frequencies, different modulations, encodings, formats, and timings from standard PNTS signals.

Figure 3:
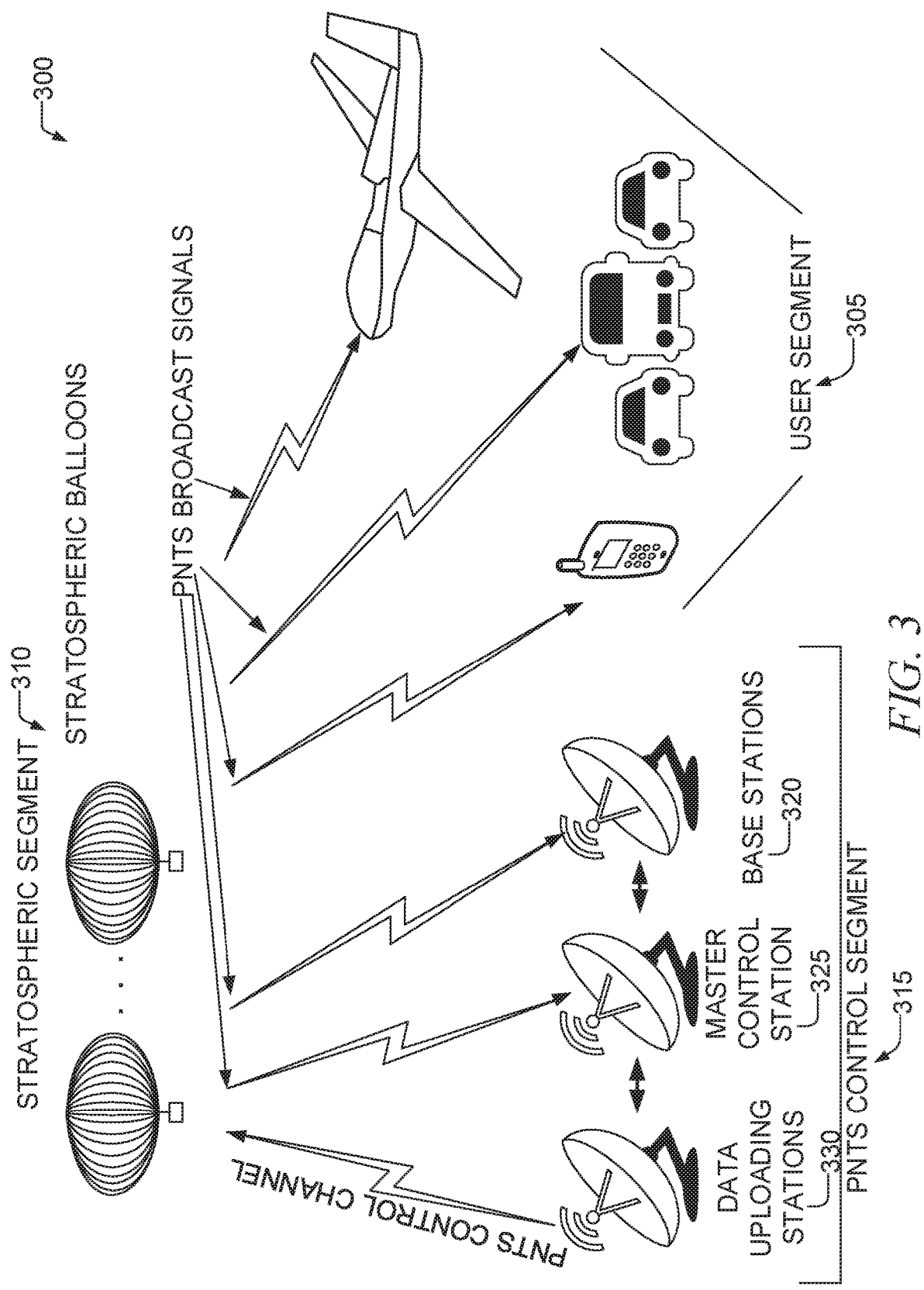
FIG. 3 illustrates an example SPNTS according to some examples of the present disclosure.

FIG. 3 illustrates an example SPNTS 300 according to some examples of the present disclosure. In FIG. 3, the PNTS control segment 315 is re-used, with or without modifications to support the stratospheric balloons of the stratospheric segment 310. For example, the ground stations of the PNTS control segment 315 may receive the PNTS broadcast signals sent by the stratospheric balloons, calculate precise locations of the stratospheric balloons and pass this information to the master control station 325. As noted previously, the positioning may be determined by the ground stations using received messages from the balloons, by the balloons through messages transmitted by the ground stations, by the balloons using sensors, or some combination. In other examples, other techniques such as radar may be utilized by the PNTS control segment 315 to calculate the balloons' positions. The master control station 325 or other ground station (such as base stations 320) may then calculate the navigation messages and upload them to the balloons (e.g., via data uploading stations 330). The navigation messages may include ephemeris data, information about the time and status of the stratospheric balloons, almanac data for the balloons, and the like. The PNTS control segment 315 may determine the almanac data from the observations of the ground stations as they observe the constellation of all the SPNTS balloons. This information is uploaded to the stratospheric balloons using data uploading stations. The stratospheric balloons may then broadcast this data down to the user devices of the user segment 305.

Figure 4:
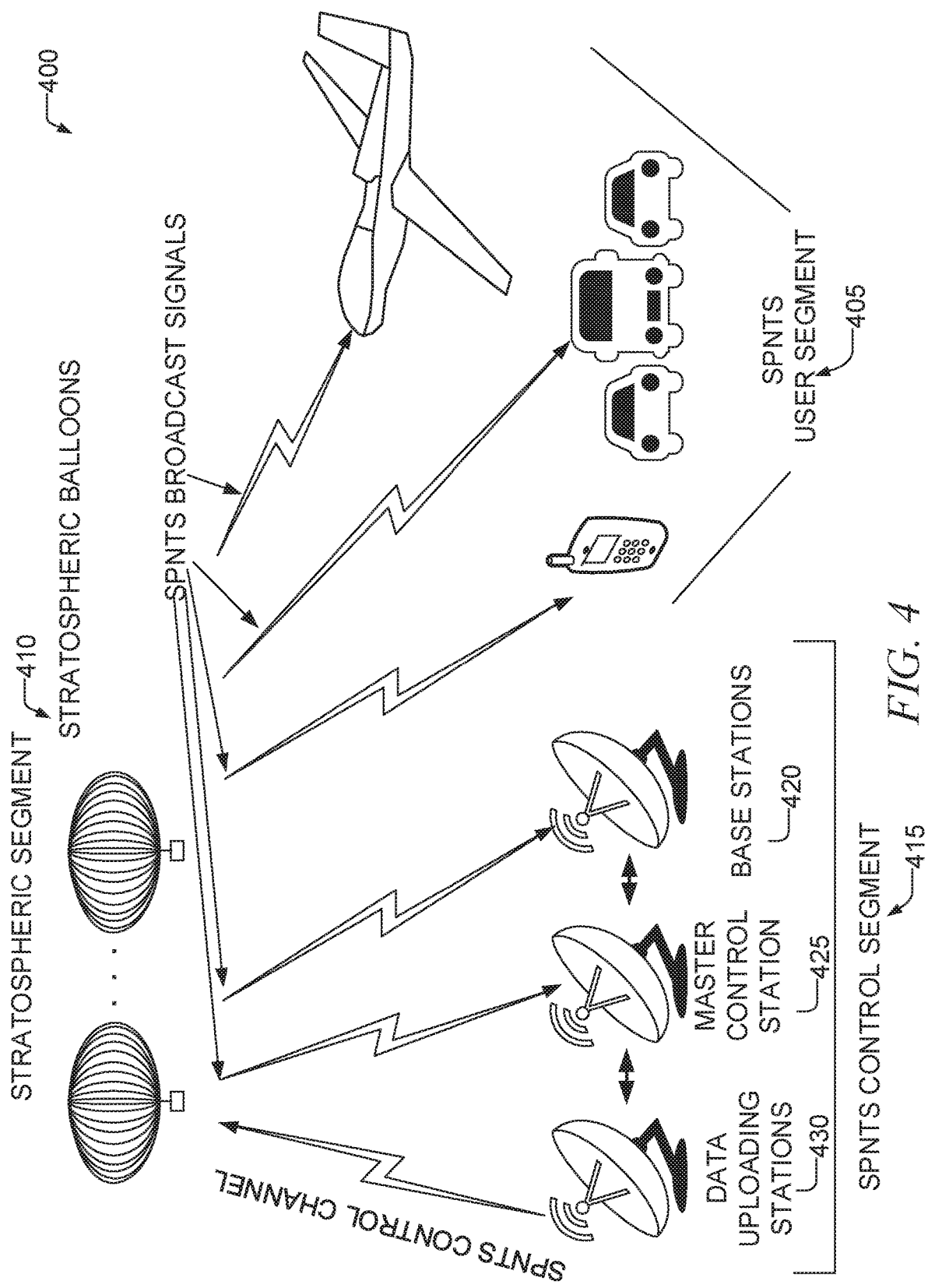
FIG. 4 illustrates an example SPNTS according to some examples of the present disclosure.

FIG. 4 illustrates an example SPNTS 400 according to some examples of the present disclosure. In FIG. 4, PNTS functionality is not reused and the SPNTS 400 features specialized control segments, control channels, broadcast signals and user segments. In FIG. 4, the frequency, timing, modulation, encoding, format, or the like of the various SPNTS messages may be different than corresponding signals of the PNTS (e.g., a GNSS) network—necessitating different hardware and/or software that is capable of decoding and processing the new format. This may be done to avoid interfering with (potentially) still operating parts of the PNTS network, or may be done so as to restrict access to the network, or may be done to tailor the system to the balloons. Positioning of the balloons may be accomplished as shown in FIG. 3. Thus, the SPNTS control segment 415 may feature SPNTS base stations 420, an SPNTS master control station 425, and one or more SPNTS data uploading stations 430. The user segment may be an SPNTS user segment 405 with devices that have receivers capable of receiving and decoding the SPNTS broadcast signals from the stratospheric segment 410.

In all of the above variations, the space segment of a PNTS system is replaced in whole or in part with a stratospheric segment comprising various stratospheric balloons such as super pressure balloons, zero pressure balloons, and the like. In some examples the balloons may be targeted to fly at altitudes between 50,000 and 200,000 feet. The balloons may have altitude changing capabilities, which may be used to catch wind currents to reposition the balloons. For example, the balloon may be a RAVEN AEROSTAR THUNDERHEAD BALLOON® System.

In some examples, the balloons in the stratospheric segment may calculate, or assist in the calculation of their own positions using one or more sensor inputs. Sensors may include electro-optical and infrared (IR) sensors that may geolocate the balloon based upon detected ground features; inertial navigation sensors (including accelerometer and gyroscope micro electro-mechanical (MEMS) such as in inertial measurement units (IMUs)); RADAR that might geolocate based upon terrain elevation feature matching; a satellite GPS receiver (e.g., in some scenarios, the altitude of the balloons may allow the balloon to be above interference that renders the PNTS unusable for ground based users); a celestial imaging sensor (e.g., by measuring bearings to multiple stars identified from a star database as a function of a given position and time, the geolocation of the balloon can be determined); directional RF sensing arrays that position the balloon and the like; and additional aiding sensors such as barometers (e.g., for altitude determination) and magnetometers (which, in combination with a world magnetic world (WMM), may be used in position and attitude estimation). One or more of these sensors may provide an input into a position estimation filter, such as a Bayesian Filter. The Bayesian filter calculates the belief distribution (of the position and attitude) from the sensor measurements and performs inferences through the application of Bayes' rule. Examples include the Extended Kalman Filter (EKF), the Unscented Kalman Filter (UKF), and the Particle Filter (PF). In some examples, the Particle and Kalman methods may be combined to form a robust localization inference and tracking framework that is independent of PNTS.

Using the position of the balloon (e.g., geospatial position and/or altitude), the balloon may calculate the navigation data itself—including the ephemeris data, time parameters, and clock corrections and broadcast that signal, along with coarse and/or precision acquisition codes in the same way that a PNTS satellite would. These signals may then be demodulated and utilized by user devices to calculate their positions. In some examples, a network of balloons may be deployed and a plurality of signals from a plurality of respective balloons may be utilized to calculate the position of the user device through trilateration.

As previously discussed, in some examples, a control segment—either the same control segment utilized for PNTS (but modified to also perform those functions with the stratospheric segment) or a wholly separate control segment may perform the same functions for the stratospheric segment as they do for the space segment.

Also, as discussed, in some examples, existing PNTS receiver devices may be utilized to receive, decode, and process the positioning signal broadcast by the stratospheric balloon to determine a geospatial position of the user device. The stratospheric balloons may broadcast a signal with the same data format and on the same frequencies that may be decoded by off-the-shelf PNTS devices and used to calculate their position. In some examples, to avoid damaging the sensitive PNTS receivers, the stratospheric balloons may reduce their transmission power, or otherwise attenuate their signal so as to be received by the PNTS devices at a power level normally received. In some examples, the SPNTS may offer improved localization abilities for user devices as the signals from the SPNTS may not suffer from the ionic disturbances that affect signals of the PNTS as ionospheric and other atmospheric effects may be reduced due to the lower altitudes of the balloon systems.

As in a PNTS such as a GNSS, the user segment device may determine its position by utilizing the position information (e.g., ephemeris information) of multiple balloons along with the ranging information that tells the user device how far away it is from each balloon to the user device. In examples in which the almanac is not provided (e.g., there is no control segment or a minimal control segment), the user devices may have to scan on all frequencies and with all pseudorandom noise (PRN) codes in order to acquire enough stratospheric balloons to accurately position itself. In some examples, when one stratospheric balloon has been located, the balloon may downlink almanac information to aid the acquisition of other stratospheric balloons.

Synchronization of the clocks on the various balloons may be accomplished, for example, by one or more of: utilizing an accurate atomic clock on each balloon, receiving synchronization information from ground control stations; balloon-to-balloon timing synchronization messages (e.g., using long range RF communications or satellite communications); utilizing RF broadcasts of an atomic clock (e.g., from a radio station), utilizing GPS signals, and the like.

In some examples, the SPNTS may always be deployed and active (and be designed to avoid interfering with the PNTS). In other examples, the SPNTS may be always deployed and only activated when needed (e.g., during a PNTS outage). In still other examples, the SPNTS may be deployed and activated when needed.

In some examples, a system may include some balloons and some PNTS satellites. For example, in a situation in which some PNTS satellites are available, but not enough to ensure good coverage in a particular area or with a particular accuracy. The stratospheric balloons and the PNTS satellites may cooperate together—e.g., the control segment may allocate frequencies and/or PRN codes to PNTS satellites and the stratospheric balloons cooperatively such that they do not interfere with each other. In these examples the stratospheric segment may supplement the PNTS satellites. This may be especially useful in situations in which PNTS satellites are available, but extra positional accuracy may be desired. In this scenario, a user device may acquire one or more PNTS satellites and one or more balloons to more accurately pinpoint its location. In some examples, as previously discussed the user devices may not be able to differentiate whether the PNTS signal is coming from the PNTS satellite or the stratospheric balloon.

Figure 5:
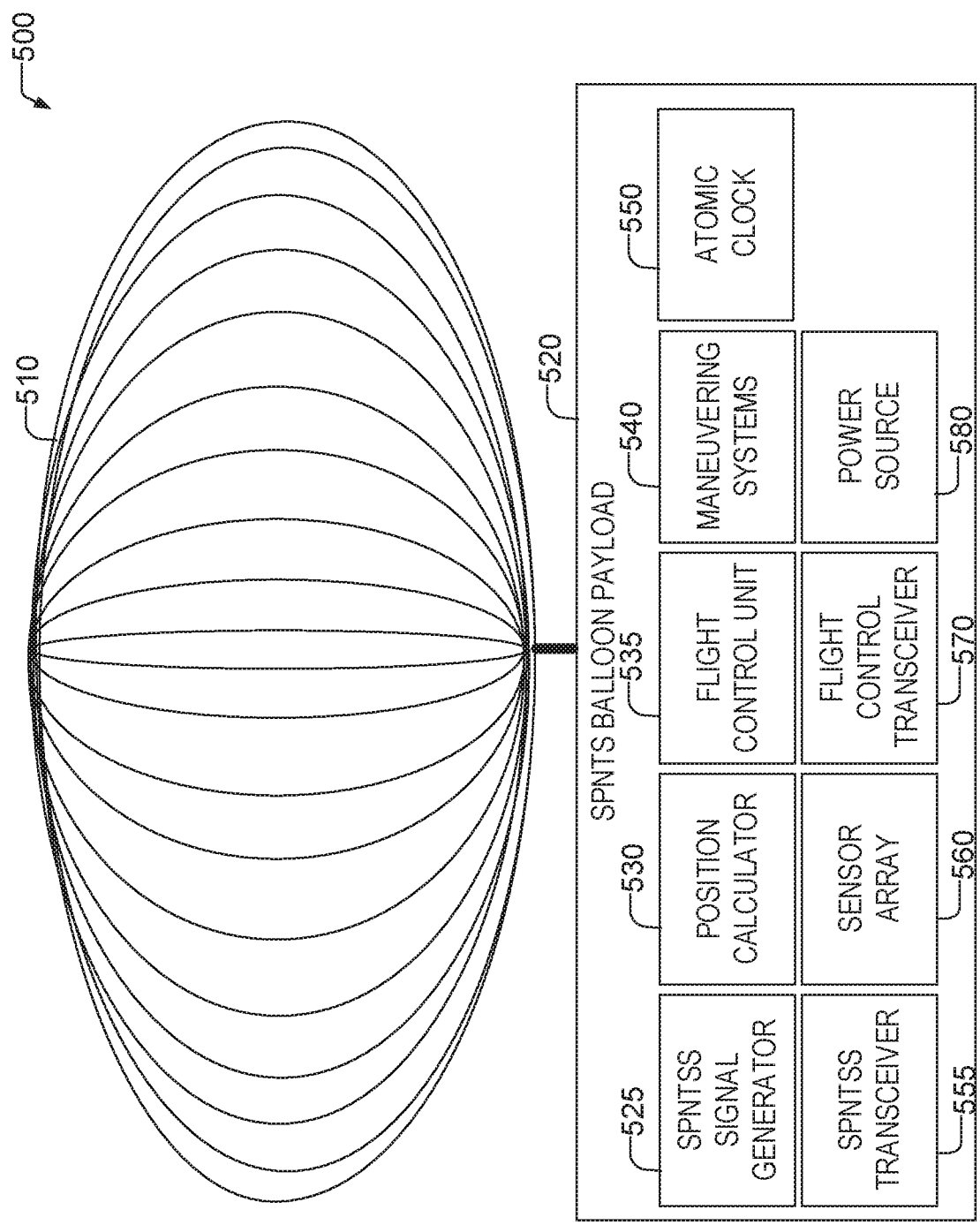
FIG. 5 illustrates a block diagram of a stratospheric balloon, according to some examples of the present disclosure.

FIG. 5 illustrates a block diagram of a stratospheric balloon system 500, according to some examples of the present disclosure. The stratospheric balloon system 500 may include a SPNTS balloon 510 and an SPNTS balloon payload 520. The components of the SPNTS balloon payload 520 in FIG. 5 may be implemented via hardware and/or software. In one example the SPNTS balloon 510 may be a RAVEN AEROSTAR THUNDERHEAD® Balloon using a stratospheric super pressure balloon (SPB) designed to fly at altitudes between approximately 50,000 and 200,000 feet and possessing altitude change capabilities. In another example, the SPNTS balloon 510 may be a zero pressure balloon. The SPNTS balloon payload 520 may be tethered or otherwise attached to the SPNTS balloon 510. The SPNTS balloon payload 520 may include one or more computing devices, processors, hardware, electronics, actuators, and the like. For example, an atomic clock 550, maneuvering systems 540, a power source 580, flight control unit (FCU) 535, flight control transceiver 570, position calculator 530, sensor array 560 comprising one or more sensors, SPNTS signal generator 525, SPNTS transceiver 555, and the like. The power source 580 may be battery power, solar power, a combination of battery and solar power, and the like. In some examples, the power source 580 may be a fuel cell, a generator driven by an internal combustion engine, a generator driven by a jet engine, or the like.

Maneuvering systems 540 may alter the heading, speed, altitude, or other flight parameter of the balloon. For example, the maneuvering system 540 may alter an altitude of the balloon. Maneuvering system 540 may include fans, turbines, jet engines, compressed air, aero foils, flaps, ailerons, rudders, other flight control surfaces, aerodynamic force generating devices, and the like.

Flight control transceiver 570 may receive an RF control channel that may provide navigational and other flight control instructions to the balloon from a control station on the ground. The control station may be a PNTS master control station, SPNTS master control station, or a different ground station.

The Flight Control Unit (FCU) 535 may receive these commands and instruct the maneuvering systems 540 to carry out these commands. For example, by actuating a rudder, aileron, or other flight control surface; activating a fan or other motor; and the like. In some examples, the FCU 535 may provide to the flight control transceiver 570, sensor array outputs for sensors to send to the control station to allow the control station to monitor the flight parameters and better control the flight. In some examples, the balloon may be autonomous or semi-autonomous and the FCU 535 may utilize sensor outputs from the sensor array 560 and/or also commands from the ground station to make navigation decisions, such as altering an altitude, speed, heading, or other flight parameter. For example, a ground station may specify flight targets (e.g., a target location) and the FCU 535 may utilize the sensor outputs to make decisions as to how best to achieve the target. The FCU 535 may also include flight system health monitoring, power management including payload needs and propulsion estimates, beyond line of sight (BLOS) and line of sight (LOS) systems for real-time command and control, operation of the altitude control systems (ACS) through the activation of the maneuvering systems 540 (e.g., to affect wind steered navigation), and the like.

The FCU 535 may contain or be coupled to one or more sensors. Sensor array 560 may include one or more micro electro-mechanical (MEMS) inertial measurement units (IMUs), barometers to sense current ambient pressure, magnetometer (digital compass), a real time clock, a PNTS receiver, an altimeter, an air speed sensor, and the like. The data from these sensor arrays may be filtered by a field-programmable gate array (FPGA) and communicated to balloon subsystems and ground control systems, as well as various balloon payloads via an onboard computing network (e.g., Ethernet). In some examples, the filtering algorithm may be a sensor fusion application that may match available inputs and their expected accuracies.

Other sensors in the sensor array 560 may include one or more optical sensors. For example, an optical sensor that registers landmark images of the ground. This may assist in accurately locating the balloon when over land and in instances in which the visibility to the ground is unobstructed by clouds and particles.

Another sensor that may be in the sensor array 560 may include one or more celestial object imaging sensors. The stratospheric balloon may have an unobstructed view of celestial objects along the horizon during daytime and nighttime conditions. By measuring bearings to multiple stars or other celestial bodies identified from a database (e.g., a star database) as a function of a given position and time, the balloon's location can be estimated.

Still another example sensor that may be in the sensor array 560 may include one or more directional RF Sensing Arrays. If the balloon is operating within the range of existing terrestrial based RF navigation aids such as VHF omnidirectional range (VOR) stations, distance measuring equipment (DME), non-directional beacons (NDB), and Tactical Air Navigation System (TACAN) stations, the RF sensing arrays may utilize these signals to locate the balloon. Additionally, signals of opportunity, such as signals in frequency modulation (FM) and amplitude modulation (AM) radio bands (e.g. radio stations, TV stations) as well as Secondary Air Traffic RADAR, can serve as navigational aids. In order to compute a localization solution from bearing to identified stations the system will utilize a database of locations and identification signatures for these transmitters. In the cases where the transmitter power is also known, as part of the signature, a navigation system can derive a range estimate in addition to bearing. For example, ground stations of the control segment may broadcast one or more signals that may be triangulated by the balloon to calculate its position. In other examples, the position may be calculated by ground stations and fed to the SPNTS receiver.

Farther from the coastline, observations (RADAR, electro-optical or infrared) of airplanes and seaborne vessels can be used, in conjunction with the known locations of those vehicles which can be extracted from ADS-B transmissions or direct transponder interrogations of aircraft, or from AIS transmissions from vessels. Finally, if no other adequate RF sources are available, a simple cooperative beacon could be placed on a buoy, vessel, or small autonomous surface vehicle.

Still another example sensor that may be in the sensor array 560 includes one or more magnetometers. The magnetometer may be used to compute a heading. In some examples, registering the locally measured three-dimensional magnetic field vector with that predicted from a world magnetic model (WMM) for a given time and date and position, will serve as an attitude and position update as well.

Still yet another example sensor that may be in the sensor array 560 includes one or more barometers. One input for altitude determination will be barometer readings (although other data, such as RF range information, may contribute as well).

A variety of different sensor outputs may be fused together to estimate a location of the balloon through the use of a Bayesian Filter. That is the Bayesian filter can fuse any combination of sensors (e.g., altimeter, star tracker) with any combination of localization methods (e.g., Very High Frequency Omnidirectional Range (VOR)/Distance Measuring Equipment (DME), signals of opportunity) with any combination of sensor modality (e.g., RADAR, electro-optical or infrared). This algorithm calculates the belief distribution (of the position and attitude) from measurements and performs inferences through the application of Bayes' rule. Efficient implementations of a Bayes filter are the Extended Kalman Filter (EKF), the Unscented Kalman Filter (UKF) and the Particle Filter (PF). Both Particle and Kalman methods can be combined and form a robust localization inference and tracking framework that is independent of GPS. Thus, the Bayesian filter takes in many different measurements (e.g. velocity, magnetic heading, barometric altitude and a DME that provides slant ranges to known radio station locations, etc. . . . ) from the various sensors, and outputs the most common position estimate (latitude, longitude, and altitude) that would best explain all of the individual measurements probabilistically, taking into account the uncertainty of these individual sensors.

In some examples, if a control segment is utilized, the position data of the balloon (e.g., and the navigation information for the GNSS messages) may be received from the control segment over a control channel using the SPNTS transceiver 555. In some examples, sensor data from onboard sensors may be sent to the control segment via the SPNTS transceiver 555 (e.g., over a control channel) and the sensor data may augment measurements of the position of the balloon as observed by the base stations of the control segment. In other examples, the position of the balloon may be calculated by the control segment only using data observed by the base stations of the control segment. The position information may then be provided to the balloon through signals received by the SPNTS transceiver 555.

In some examples, rather than receive the positional data from the control segment, ground reference stations of the control segment may transmit positional signals that are received by the SPNTS transceiver 555 and then utilized by the balloon to calculate its position. Each balloon may continuously search the RF band for the strongest ground reference signals in the vicinity. When timing signals are received the signals come with a ground reference station identification embedded in it, which allows the balloon to calculate its position if the balloon has an updated version of metadata that includes the ground reference station location (e.g., the metadata may be programmed into the balloon upon launch and/or may be updated by RF communications). In some examples, however, the ground reference station location and synchronization information may be embedded in the positional signal transmitted by the control segment such that the balloon localization algorithm is independent from the metadata. Knowing the transmitter location is not only necessary for solving the localization solution, but it will also help with picking the ground reference stations that collectively provide the most optimal trilateration geometry.

The SPNTS signal generator 525 may take the positional data and convert it to ephemeris data and package it as a PNTS signal (such as a GNSS signal), an SPNTS signal or the like and transmit it via the SPNTS transceiver. The balloon may provide an RF interface identical to the existing PNTS standards such that the millions of PNTS receivers already in service can be continued to be used. The balloon may provide the information through the PNTS interface, through a proprietary SPNTS RF interface, or in some examples, both. When providing a current PNTS receiver compatible RF interface, in some examples, the balloon may generate the same digitally pseudorandom encoded spread spectrum signals that are used as the actual timing signals in the PNTS receivers, and the balloon will translate the metadata to ephemeris and almanac data. The signals may be broadcasted at the correct (lower) power such that the received signal to noise ratio remains unchanged.

As previously described, the control segment comprises a widespread (possibly global) connected network of ground stations (such as data uploading stations, master control stations, base stations, or a station that implements one or more of the functions of each). Each ground station (also referred to as a ground reference station) has a unique identification, is accurately surveyed, and has an atomic clock that is perfectly synchronized with the other ground stations. The ground stations provide a direct line of sight communication with the stratospheric balloons that are in its vicinity. The primary function of the ground station is to provide the balloons in the stratospheric segment with a synchronized timing signal from which it can compute the pseudorange to that ground station, with the intent to estimate the balloon's location in combination with pseudorange measurements to multiple other ground reference stations.

A timing signal intended for pseudorange computation includes the ground station identification. In some examples, the timing signal may also include the ground station location and synchronization timing information with it. Besides providing a timing signal for computing the pseudorange, the ground stations also provides a communication channel for additional metadata which has a similar purpose as that of the ephemeris and almanac data with PNTS.

In some examples, instead of a single master control system (as in a GNSS of a PNTS), the presently disclosed ground segment may consist of a fully distributed network making use of distributed secure databases such as a blockchain in order to ensure data integrity and synchronization over all the ground stations and the balloons. Each ground station and each balloon may store the complete metadata (the equivalent to ephemeris and almanac data with a PNTS such as a GNSS and in the present disclosure—information like the position and velocity of the balloons, the locations of the ground reference stations, differential corrections for each ground reference station, time offsets to each balloon atomic clock in order to stay synchronized, etc.). Rather than a centralized approach where this data is computed, compiled and then uploaded to the balloons every 8 hours, the individual units will (ground reference stations and the balloons) compute their own part of this data and then propagate this change to all other units (ground reference stations and the balloons) via a blockchain-like algorithm.

By utilizing a distributed approach, the ground segment may have reduced overall data traffic, be more resilient to sabotage, feature data persistence, and the like. In some examples, encryption of the information may be utilized to ensure the necessary security and data protection.

Another advantage of the decentralized approach is that each ground station includes a user receiver, and as such it can compute the location error when compared to its accurately surveyed location, functioning as a differential PNTS station and relaying correction data to the user segment via the stratospheric segment (as part of the block data). This is an advantage in that it eliminates the needed reference stations that are used today to get the accuracy needed.

The distributed metadata block maintained over the ground stations and balloons may contain the following information:

Location and ID of all the ground reference stations
Location and velocity of all the balloons
Status of the ground reference stations
Status of the balloons
Balloon command and control (replacing Iridium)
Differential corrections As noted, if ground stations are not used, the balloons will be able to find their own location with sensor technology. Sensors such as inertial navigation units, celestial object imaging sensors, and the like may be utilized to find their location. The balloons may also utilize balloon-to-balloon communications to keep the atomic clocks synchronized.

User devices may be relatively unchanged. If there is a change where the frequency used by current PNTS devices cannot be used then there may be new user devices or converter boxes that would decode the information and send it to the receiver.

In some examples, the balloons may locate themselves using sensors and then fusing those sensor outputs together with software to determine a position estimate. In other examples, the location from the sensors may be calculated by, or supplemented with, ground stations—either through reception by the balloon of radio signals sent by the ground stations (whose position is known), or by reception of signals sent by the balloon to ground stations. In yet other examples, other techniques of locating the balloons may include radar, laser, and the like.

The examples herein focused on navigational and positional aspects of the PNTS, but it will be appreciated by one of ordinary skill in the art with the benefit of applicant's disclosure that the SPNTS can also be utilized to broadcast timing or other information to one or more user devices of a user segment.

Figure 6:
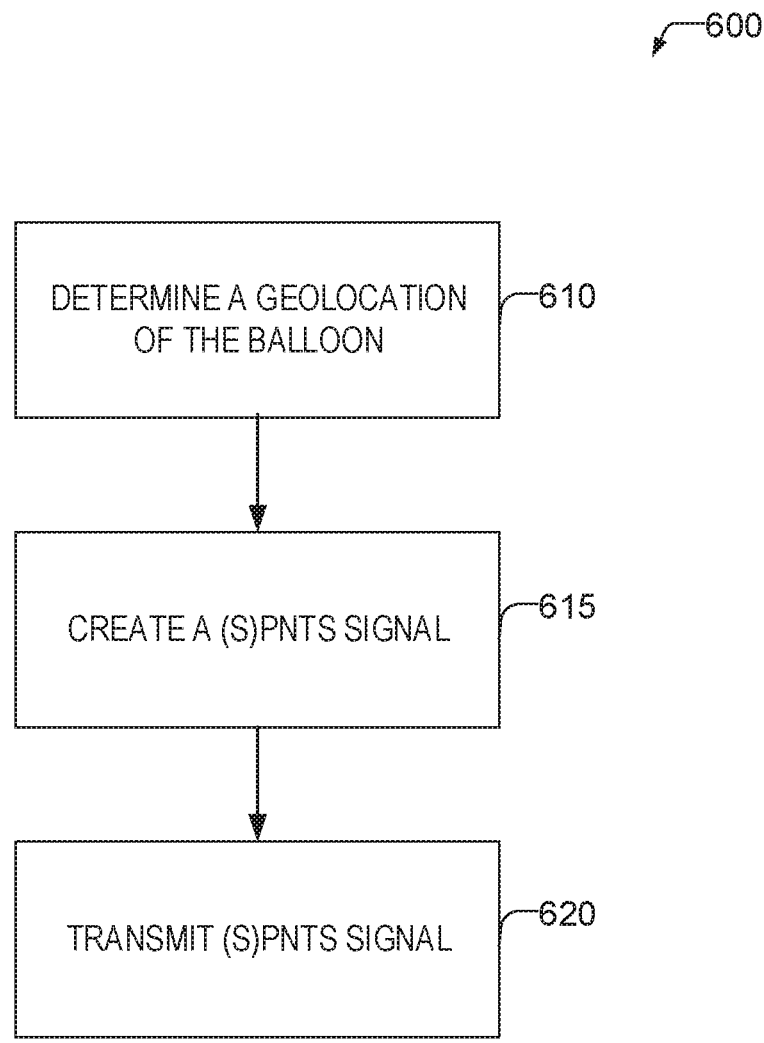
FIG. 6 illustrates a flowchart of a method of an SPNTS balloon payload providing a PNTS signal according to some examples of the present disclosure.

FIG. 6 illustrates a flowchart of a method 600 of an SPNTS balloon payload providing a PNTS signal according to some examples of the present disclosure. At operation 610 the balloon payload may determine a geolocation of the balloon. As described previously this may be accomplished by utilizing one or more onboard sensors, RF signals from ground equipment, may be provided by the ground equipment, or any combination. At operation 615 the payload may utilize the geolocation to generate one or more PNTS signals, such as GNSS signals. In some examples, the signals may be particular to the SPNTS signal, but in other examples, the signals may be regular PNTS signals (e.g., GNSS signals). At operation 620 these signals may be transmitted to one or more user devices. The signals may be usable by the device to trilaterate the device's position, set a clock of the device, or the like.

Figure 7:
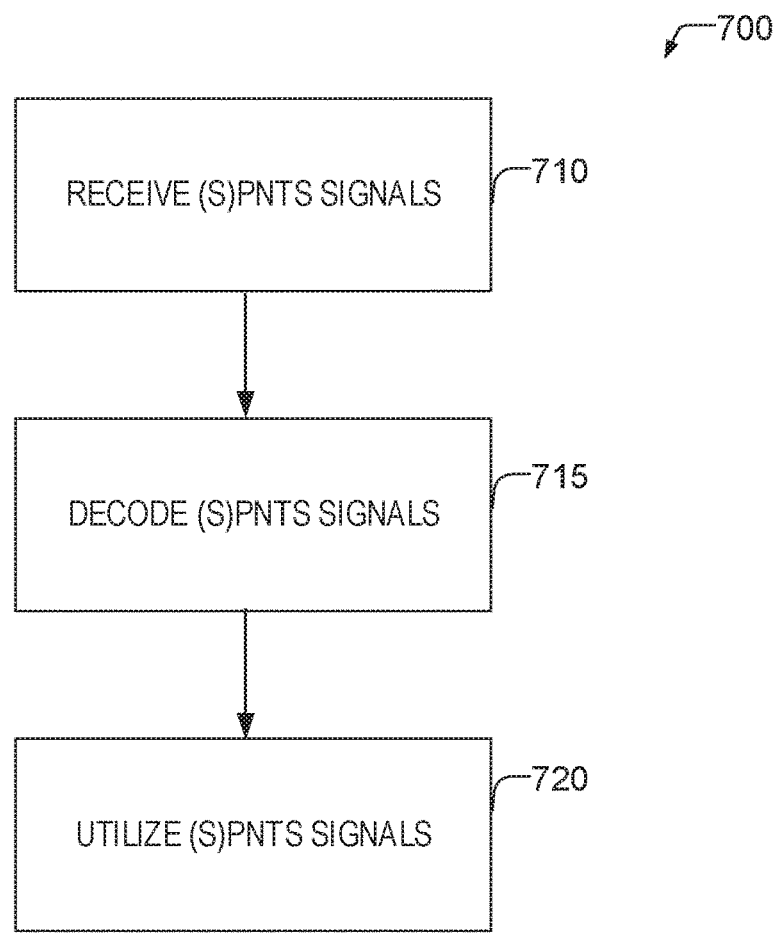
FIG. 7 illustrates a flowchart of a method of an PNTS or an SPNTS device utilizing a PNTS signal provided by an SPNTS balloon according to some examples of the present disclosure.

FIG. 7 illustrates a flowchart of a method 700 of an PNTS or an SPNTS device utilizing a PNTS signal provided by an SPNTS balloon according to some examples of the present disclosure. At operation 710, the device receives one or more PNTS or SPNTS signals. In the case of PNTS signals, the balloon is broadcasting a signal that mimics a standard PNTS signal. In the case of SPNTS signals, the balloon is sending out PNTS signals on a different frequency, and/or using a different format than PNTS signals that may be specific to the SPNTS. At operation 715 the signals received in operation 710 are decoded. For example, they may be demodulated and decoded. At operation 720 the decoded signals may be used to perform one or more PNT functions, such as calculating a position by trilateration.

Figure 8:
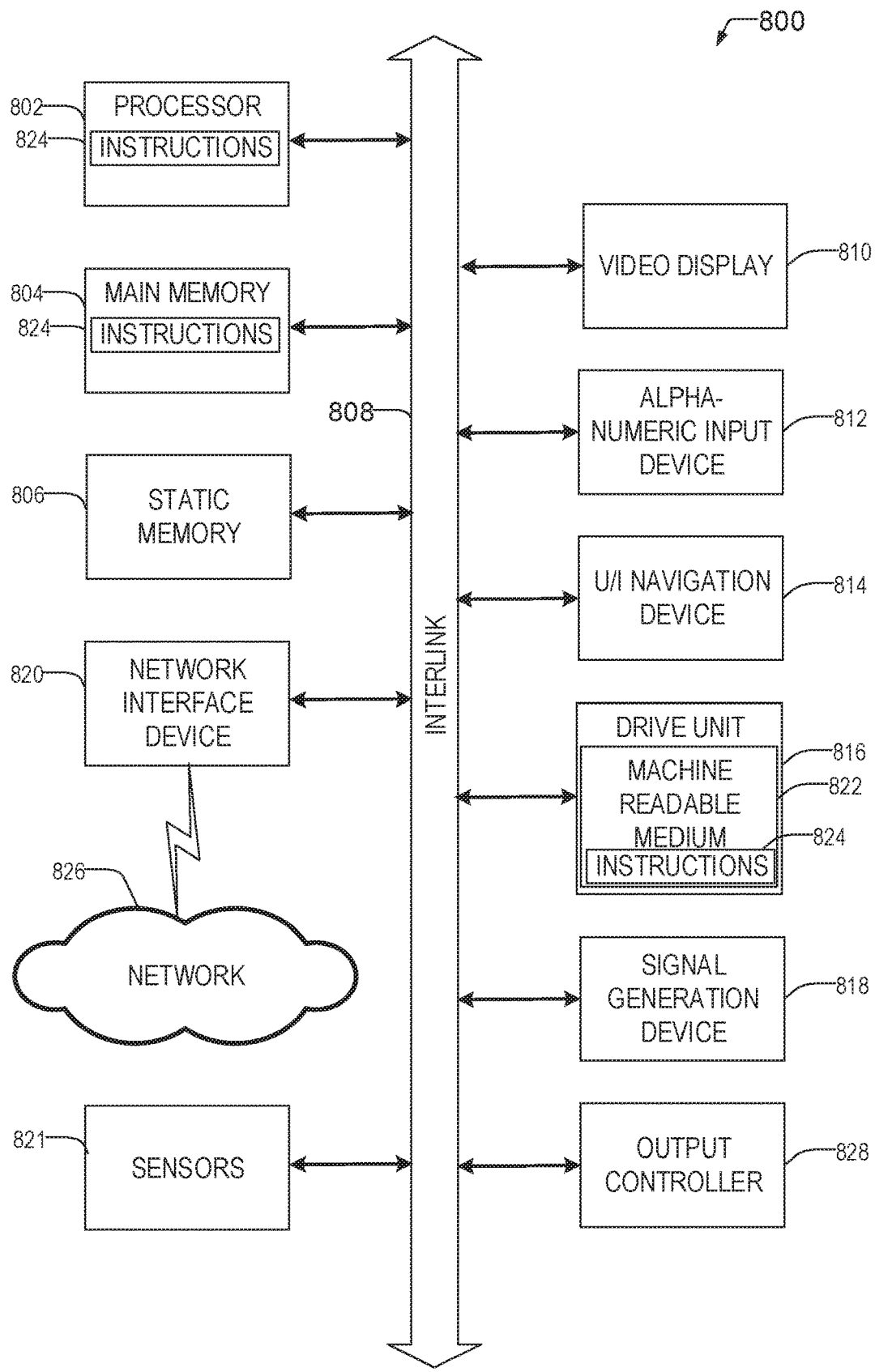
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. Machine 800 may be a balloon (or electronics or payload of a balloon), a ground reference station (e.g., a data uploading station, master control station, base station), a user device, or the like. For example, machine 800 may implement one or more of the components of FIG. 5, methods of FIGS. 6 and 7, or one or more user segment devices. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, inertial measuring units, optical sensors, RF sensors, magnetometer, barometer, artificial intelligence acceleration unit, or other sensors. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices (NAND, SSDs); magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The Machine 800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®). IEEE 802.15.4 family of standards, a Long Term Evolution (LTE) family of standards, a Universal Mobile Telecommunications System (UMTS) family of standards, peer-to-peer (P2P) networks, GNSS signals, among others. In an example, the network interface device 820 may include one or more physical jacks (e.g., Ethernet, coaxial or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

OTHER NOTES AND EXAMPLES

Example 1 is a device comprising: a balloon; a computing device coupled to the balloon, the computing device comprising: a hardware processor configured to: determine a geolocation of the balloon; and a transceiver configured to: broadcast a signal based upon the geolocation that includes, data useable by a user segment receiver for trilateration as part of resolving its global position.

In Example 2, the subject matter of Example 1 includes, wherein the transceiver is further configured to broadcast a ranging code.

In Example 3, the subject matter of Examples 1-2 includes, wherein the hardware processor is configured to determine the geolocation of the balloon based upon geolocation signals received from a plurality of ground-based reference signals.

In Example 4, the subject matter of Examples 1-3 includes, wherein the computing device coupled to the balloon includes a sensor, and wherein the hardware processor is configured to determine the geolocation of the balloon based upon an output of the sensor.

In Example 5, the subject matter of Example 4 includes, wherein the sensor is an inertial measurement unit.

In Example 6, the subject matter of Examples 4-5 includes, wherein the sensor is a barometer.

In Example 7, the subject matter of Examples 4-6 includes, wherein the sensor is an optical sensor.

In Example 8, the subject matter of Examples 4-7 includes, wherein the sensor is one of: a directional RF sensor array, a magnetometer, RADAR, radio navigation aids.

In Example 9, the subject matter of Examples 4-8 includes, wherein the hardware processor is configured to determine the geolocation of the balloon by inputting the output of the sensor into a Bayesian filter to produce estimated geolocation coordinates.

In Example 10, the subject matter of Examples 4-9 includes, wherein the hardware processor is configured to determine the geolocation of the balloon from a message sent by a ground-based station and output of the sensor.

In Example 11, the subject matter of Examples 1-10 includes, an atomic clock.

In Example 12, the subject matter of Example 11 includes, wherein the hardware processor is configured to synchronize the atomic clock to a plurality of atomic clocks in a plurality of other balloons.

In Example 13, the subject matter of Examples 1-12 includes, wherein the transceiver is configured to broadcast the geolocation of the balloon as a positioning signal in a same format as a global navigation satellite system (GNSS) positioning signal.

Example 14 is a method of providing a signal for Positioning, Navigation, or Timing, the method comprising: from a computing device coupled to a balloon, using a hardware processor to perform operations of: determine a geolocation of the balloon; and broadcast a signal based upon the geolocation that includes, data useable by a user segment receiver for trilateration as part of resolving its global position.

In Example 15, the subject matter of Example 14 includes, wherein the operations of determining the geolocation of the balloon comprises determining the geolocation of the balloon based upon geolocation signals received from a plurality of ground-based reference signals.

In Example 16, the subject matter of Examples 14-15 includes, wherein the operations of determining the geolocation of the balloon comprises determining the geolocation of the balloon based upon an output of a sensor that is both communicatively coupled to the hardware processor and attached to the balloon.

In Example 17, the subject matter of Example 16 includes, wherein the sensor is one or more of: an inertial measurement unit, a barometer, an optical sensor, a celestial sensor, a directional RF sensor array, a magnetometer, radio detection and ranging (RADAR), and a radio navigational aid.

In Example 18, the subject matter of Examples 16-17 includes, wherein the operations of determining the geolocation of the balloon comprises determining the geolocation of the balloon by inputting the output of the sensor and a second sensor into a Bayesian filter to produce estimated geolocation coordinates.

In Example 19, the subject matter of Examples 16-18 includes, wherein the operations of determining the geolocation of the balloon comprise determining the geolocation of the balloon from a message sent by a ground-based station and output of the sensor.

In Example 20, the subject matter of Examples 14-19 includes, wherein the operations further comprise broadcasting the geolocation of the balloon as a positioning signal in a same format as a global navigation satellite system (GNSS) positioning signal.

In Example 21, the subject matter of Examples 14-20 includes, wherein the operations further comprise synchronizing an atomic clock of the balloon to a plurality of atomic clocks in a plurality of other balloons.

In Example 22, the subject matter of Example 21 includes, wherein the operations further comprise broadcasting a ranging code.

Example 23 is a machine-readable medium, storing instructions for providing a position, navigation, or timing signal, the instructions, when executed by a machine coupled to a balloon, cause the machine to perform operations comprising: determine a geolocation of the balloon: and broadcast a signal based upon the geolocation that includes, data useable by a user segment receiver for trilateration as part of resolving its global position.

In Example 24, the subject matter of Example 23 includes, wherein the operations of determining the geolocation of the balloon comprises determining the geolocation of the balloon based upon geolocation signals received from a plurality of ground-based reference signals.

In Example 25, the subject matter of Examples 23-24 includes, wherein the operations of determining the geolocation of the balloon comprises determining the geolocation of the balloon based upon an output of a sensor that is attached to the balloon.

In Example 26, the subject matter of Example 25 includes, wherein the sensor is one or more of: an inertial measurement unit, a barometer, an optical sensor, a celestial sensor, a directional RF sensor array, a magnetometer, radio detection and ranging (RADAR), and a radio navigational aid.

In Example 27, the subject matter of Examples 25-26 includes, wherein the operations of determining the geolocation of the balloon comprises determining the geolocation of the balloon by inputting the output of the sensor and a second sensor into a Bayesian filter to produce estimated geolocation coordinates.

In Example 28, the subject matter of Examples 25-27 includes, wherein the operations of determining the geolocation of the balloon comprise determining the geolocation of the balloon from a message sent by a ground-based station and output of the sensor.

In Example 29, the subject matter of Examples 23-28 includes, wherein the operations further comprise broadcasting the geolocation of the balloon as a positioning signal in a same format as a global navigation satellite system (GNSS) positioning signal.

In Example 30, the subject matter of Examples 23-29 includes, wherein the operations further comprise synchronizing an atomic clock of the balloon to a plurality of atomic clocks in a plurality of other balloons.

In Example 31, the subject matter of Examples 23-30 includes, wherein the operations further comprise broadcasting a ranging code.

Example 32 is a balloon comprising: means for determining a geolocation of the balloon; and means for broadcasting a signal based upon the geolocation that includes, data useable by a user segment receiver for trilateration as part of resolving its global position.

In Example 33, the subject matter of Example 32 includes, wherein the means for determining the geolocation of the balloon comprises means for determining the geolocation of the balloon based upon geolocation signals received from a plurality of ground-based reference signals.

In Example 34, the subject matter of Examples 32-33 includes, wherein the means for determining the geolocation of the balloon comprises means for determining the geolocation of the balloon based upon an output of a sensor that is attached to the balloon.

In Example 35, the subject matter of Example 34 includes, wherein the sensor is one or more of: an inertial measurement unit, a barometer, an optical sensor, a celestial sensor, a directional RF sensor array, a magnetometer, radio detection and ranging (RADAR), and a radio navigational aid.

In Example 36, the subject matter of Examples 34-35 includes, wherein the means for determining the geolocation of the balloon comprises means for determining the geolocation of the balloon by inputting the output of the sensor and a second sensor into a Bayesian filter to produce estimated geolocation coordinates.

In Example 37, the subject matter of Examples 34-36 includes, wherein the means for determining the geolocation of the balloon comprise means for determining the geolocation of the balloon from a message sent by a ground-based station and output of the sensor.

In Example 38, the subject matter of Examples 32-37 includes, wherein the means for broadcasting the geolocation of the balloon comprise means for broadcasting the geolocation of the balloon as a positioning signal in a same format as a global navigation satellite system (GNSS) positioning signal.

In Example 39, the subject matter of Examples 32-38 includes, means for synchronizing an atomic clock of the balloon to a plurality of atomic clocks in a plurality of other balloons.

In Example 40, the subject matter of Examples 32-39 includes, means for broadcasting a ranging code.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

What is claimed is:

1. A device comprising:
   a balloon;
   a computing device coupled to the balloon, the computing device comprising:
   a hardware processor configured to:

determine a geolocation of the balloon;
create almanac data comprising locations of a plurality of other balloons based upon peer-to-peer messages exchanged with the plurality of other balloons; and
a transceiver configured to:
broadcast a signal based upon the geolocation that includes data useable by a user segment receiver for trilateration as part of resolving its global position, the signal a same format and frequency as signals sent by a Global Navigation Satellite System (GNSS), the signal including the almanac data.

2. The device of claim 1, wherein the transceiver is further configured to broadcast a ranging code.

3. The device of claim 1, wherein the hardware processor is configured to determine the geolocation of the balloon based upon geolocation signals received from a plurality of ground based reference signals.

4. The device of claim 1, wherein the computing device coupled to the balloon includes a sensor, and wherein the hardware processor is configured to determine the geolocation of the balloon based upon an output of the sensor.

5. The device of claim 4, wherein the sensor is an inertial measurement unit.

6. The device of claim 4, wherein the sensor is a barometer.

7. The device of claim 4, wherein the sensor is an optical sensor.

8. The device of claim 4, wherein the sensor is one of: a directional RF sensor array, a magnetometer, RADAR, radio navigation aids.

9. The device of claim 4, wherein the hardware processor is configured to determine the geolocation of the balloon by inputting the output of the sensor into a Bayesian filter to produce estimated geolocation coordinates.

10. The device of claim 4, wherein the hardware processor is configured to determine the geolocation of the balloon from a message sent by a ground-based station and the output of the sensor.

11. The device of claim 1, comprising an atomic clock.

12. The device of claim 11, wherein the hardware processor is configured to synchronize the atomic clock to a plurality of atomic clocks in a plurality of other balloons.

13. A method of providing a signal for Positioning, Navigation, or Timing, the method comprising:
from a computing device coupled to a balloon, using a hardware processor to perform operations of:
determining a geolocation of the balloon;
creating almanac data comprising locations of a plurality of other balloons based upon peer-to-peer messages exchanged with the plurality of other balloons; and
broadcast a signal based upon the geolocation that includes data useable by a user segment receiver for trilateration as part of resolving its global position, the signal a same fomrn.t and frequency as signals sent by a Global Navigation Satellite System (GNSS), the signal including the almanac data.

14. The method of claim 13, wherein the operations of determining the geolocation of the balloon comprises determining the geolocation of the balloon based upon geolocation signals received from a plurality of ground-based reference signals.

15. The method of claim 13, wherein the operations of determining the geolocation of the balloon comprises determining the geolocation of the balloon based upon an output of a sensor that is both communicatively coupled to the hardware processor and attached to the balloon.

16. The method of claim 15, wherein the sensor is one or more of: an inertial measurement unit, a barometer, an optical sensor, a celestial sensor, a directional RF sensor array, a magnetometer, radio detection and ranging (RADAR), and a radio navigational aid.

17. The method of claim 15, wherein the operations of determining the geolocation of the balloon comprises determining the geolocation of the balloon by inputting the output of the sensor and a second sensor into a Bayesian filter to produce estimated geolocation coordinates.

18. The method of claim 15, wherein the operations of determining the geolocation of the balloon comprise determining the geolocation of the balloon from a message sent by a ground-based station and the output of the sensor.

* * * * *